(12) United States Patent
Foster et al.

(10) Patent No.: US 9,164,915 B2
(45) Date of Patent: Oct. 20, 2015

(54) RESERVING FIXED PAGE AREAS IN REAL STORAGE INCREMENTS

(71) Applicant: International Business Machines Corporation, Armonk, NY (US)

(72) Inventors: Alfred F. Foster, Wappingers Falls, NY (US); David Hom, Poughkeepsie, NY (US); Charles E. Mari, Wappingers Falls, NY (US); Matthew J. Mauriello, Fishkill, NY (US); Robert Miller, Jr., Poughkeepsie, NY (US); Mariama Ndoye, Poughkeepsie, NY (US); Scott B. Tuttle, Staatsburg, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/741,595

(22) Filed: Jan. 15, 2013

(65) Prior Publication Data

US 2014/0201496 A1 Jul. 17, 2014

(51) Int. Cl.
*G06F 12/02* (2006.01)
*G06F 12/10* (2006.01)
*G06F 12/08* (2006.01)
*G06F 3/06* (2006.01)

(52) U.S. Cl.
CPC .............. *G06F 12/10* (2013.01); *G06F 12/08* (2013.01); *G06F 3/0644* (2013.01); *G06F 12/023* (2013.01); *G06F 2212/652* (2013.01)

(58) Field of Classification Search
None
See application file for complete search history.

(56) References Cited

U.S. PATENT DOCUMENTS

| 4,730,249 | A | 3/1988 | O'Quin, II et al. |
| 7,516,297 | B2 | 4/2009 | Mather |
| 8,078,636 | B2 | 12/2011 | Layden et al. |
| 2010/0275193 | A1 | 10/2010 | Hansen |
| 2011/0004739 | A1 | 1/2011 | Hohmuth et al. |
| 2011/0302388 | A1 | 12/2011 | Reynya et al. |

*Primary Examiner* — Duc Doan
(74) *Attorney, Agent, or Firm* — Cantor Colburn LLP; William A. Kinnaman, Jr.

(57) ABSTRACT

Embodiments of the disclosure include a method for reserving large pages in a large frame area (LFAREA) of a main memory. The method includes pre-scanning a plurality of storage increments and counting a number of available large pages that are online and issuing a message that indicates the number of available large pages. The method also includes receiving and parsing an LFAREA request including a target number of large pages to be reserved. The method further includes calculating an optimal number of large pages to be reserved, based upon the target number of available pages and a system limit. The method includes determining if the LFAREA request is valid and if the LFAREA request can be satisfied and scanning the plurality of the storage increments and reserving the optimal number of pages in the LFAREA.

27 Claims, 10 Drawing Sheets

RESERVING FIXED PAGE AREAS IN REAL STORAGE INCREMENTS

BACKGROUND

The present disclosure relates to the management of real storage, and more specifically, to reserving fixed page areas in real storage increments using target request amounts.

Many computer systems utilize a large frame area (LFAREA) to support the storage of large pages, such as pages equal to or larger than 1 megabyte (MB). The LFAREA includes one or more online real storage address increments. Currently, the real storage increments range from 64 MB to 2 gigabytes (GB) depending on the processor machine model. The number of pages to be reserved is requested via an LFAREA system parameter (e.g., LFAREA=24M is a request to reserve 24 1 MB pages in the LFAREA). Reserving a desired number of pages can be accomplished by scanning the real storage increments and selecting the real storage increments that are online and available until the requested amount is achieved. In many current systems the amount of storage that can be reserved in the LFAREA is limited to 80 percent of the online storage minus 2 GB.

As the page size of large pages used by computer systems increases, the page size may become larger than the real storage increments used by the computer system. As a result, the selection process becomes more complex since it must find enough contiguous online and available real storage increments for each page area that is to be reserved. In addition, the selection process can be further complicated by gaps in storage increments caused by offline storage increments.

SUMMARY

According to an exemplary embodiment, a method for reserving pages in a large frame area (LFAREA) of a main memory, the main memory including a plurality of storage increments, the method includes pre-scanning, by a processor, the plurality of storage increments and counting a number of available first size pages and second size pages in the plurality of storage increments that are online. The method also includes issuing a message that indicates the number of available first size pages and second size pages and receiving and parsing an LFAREA request, wherein the LFAREA request includes a target number of first size pages and second size pages. The method further includes calculating an optimal number of first size and second size pages to be reserved, based upon the target number of first size pages and second size pages, the number of available first size pages and second size pages and a system limit. The method also includes determining if the LFAREA request is valid and if the LFAREA request can be satisfied and based upon determining that the LFAREA request is valid and if the LFAREA request can be satisfied, scanning the plurality of the storage increments and reserving the optimal number of first size and second size pages in the LFAREA.

According to another exemplary embodiment, a computer program product for reserving pages in a large frame area (LFAREA) of a main memory, the main memory including a plurality of storage increments, the computer program product including a tangible storage medium readable by a processing circuit and storing instructions for execution by the processing circuit for performing a method. The method includes pre-scanning, by a processor, the plurality of storage increments and counting a number of available first size pages and second size pages in the plurality of storage increments that are online. The method also includes issuing a message that indicates the number of available first size pages and second size pages and receiving and parsing an LFAREA request, wherein the LFAREA request includes a target number of first size pages and second size pages. The method further includes calculating an optimal number of first size and second size pages to be reserved, based upon the target number of first size pages and second size pages, the number of available first size pages and second size pages and a system limit. The method also includes determining if the LFAREA request is valid and if the LFAREA request can be satisfied and based upon determining that the LFAREA request is valid and if the LFAREA request can be satisfied, scanning the plurality of the storage increments and reserving the optimal number of first size and second size pages in the LFAREA.

According to another exemplary embodiment, a computer system for reserving pages in a large frame area (LFAREA) of a main memory, the system including a real storage manager configured to control a main memory, wherein the main memory includes a plurality of storage increments, the system configured to perform a method. The method includes pre-scanning, by a processor, the plurality of storage increments and counting a number of available first size pages and second size pages in the plurality of storage increments that are online. The method also includes issuing a message that indicates the number of available first size pages and second size pages and receiving and parsing an LFAREA request, wherein the LFAREA request includes a target number of first size pages and second size pages. The method further includes calculating an optimal number of first size and second size pages to be reserved, based upon the target number of first size pages and second size pages, the number of available first size pages and second size pages and a system limit. The method also includes determining if the LFAREA request is valid and if the LFAREA request can be satisfied and based upon determining that the LFAREA request is valid and if the LFAREA request can be satisfied, scanning the plurality of the storage increments and reserving the optimal number of first size and second size pages in the LFAREA.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
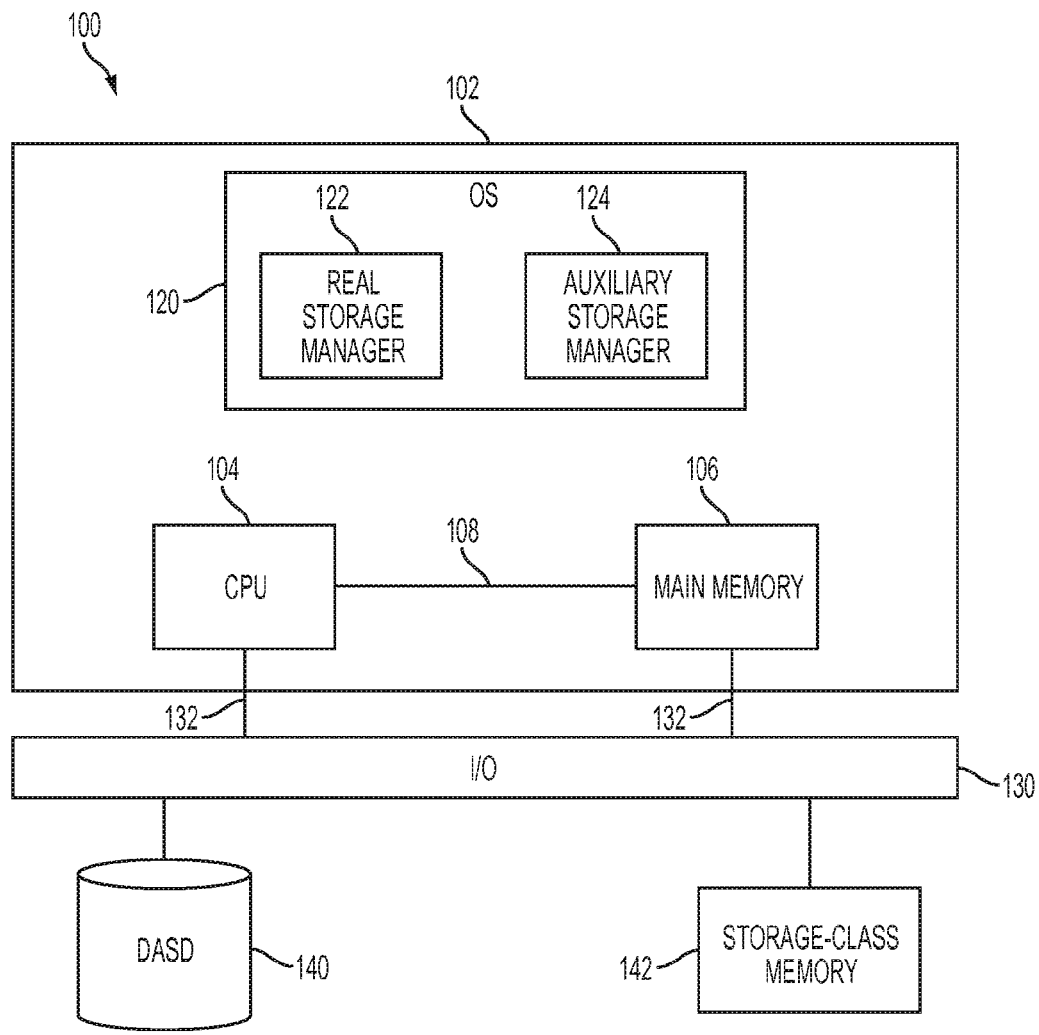
FIG. 1 is a block diagram illustrating one example of a processing system for practice of the teachings herein.

Referring now to FIG. 1, an embodiment of a computing environment to incorporate and/or use one or more aspects of the present disclosure is shown. In exemplary embodiments, computing environment 100 includes a system 102, such as one or more servers, a central processing complex, etc., that includes, for instance, one or more central processing units (CPUs) 104 coupled to main memory 106, also referred to as real storage, via one or more buses 108. One of the central processing units 104 may execute an operating system 120, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem 130 provides connectivity to one or more auxiliary storage media, including, for instance, one or more direct access storage devices (DASD) 140 and storage class memory 142 (e.g., flash memory). In one particular example of the z/Architecture®, the I/O subsystem 130 is a channel subsystem. However, the I/O subsystem 130 may be a subsystem other than a channel subsystem, and the auxiliary storage media may be media other than or in addition to DASD 140 and storage class memory 142.

Main memory 106 and auxiliary storage are managed, in one example, by managers of operating system 120, including, for instance, a real storage manager 122 and an auxiliary storage manager 124. Real storage manager 122 is responsible for tracking the contents of main memory 106 and managing the paging activities of main memory. Auxiliary storage manager 124 is responsible for tracking auxiliary storage, including DASD 140 and storage class memory 142, and for working with the real storage manager 122 to find locations to store pages that are being evicted from main memory 106.

The auxiliary storage manager 124 manages various types of auxiliary storage, including storage class memory 142, such as flash memory. In one embodiment, storage class memory 142 is read or written in varying storage block sizes, including 4K and 1 MB storage blocks, as examples. The operating system (e.g., auxiliary storage manager 124) keeps track of the blocks currently being used and by which system component. In exemplary embodiments, large pages (e.g., 1 MB or larger) include a plurality of contiguous pages (e.g. 256 for a 1 MB page) 4K pages, and each 4K page has associated therewith a page frame table entry (PFTE). Within each PFTE is an identifier that specifies the type of page, e.g., a 4 K page, a 1 MB page or a 2 GB page.

Figure 2A:
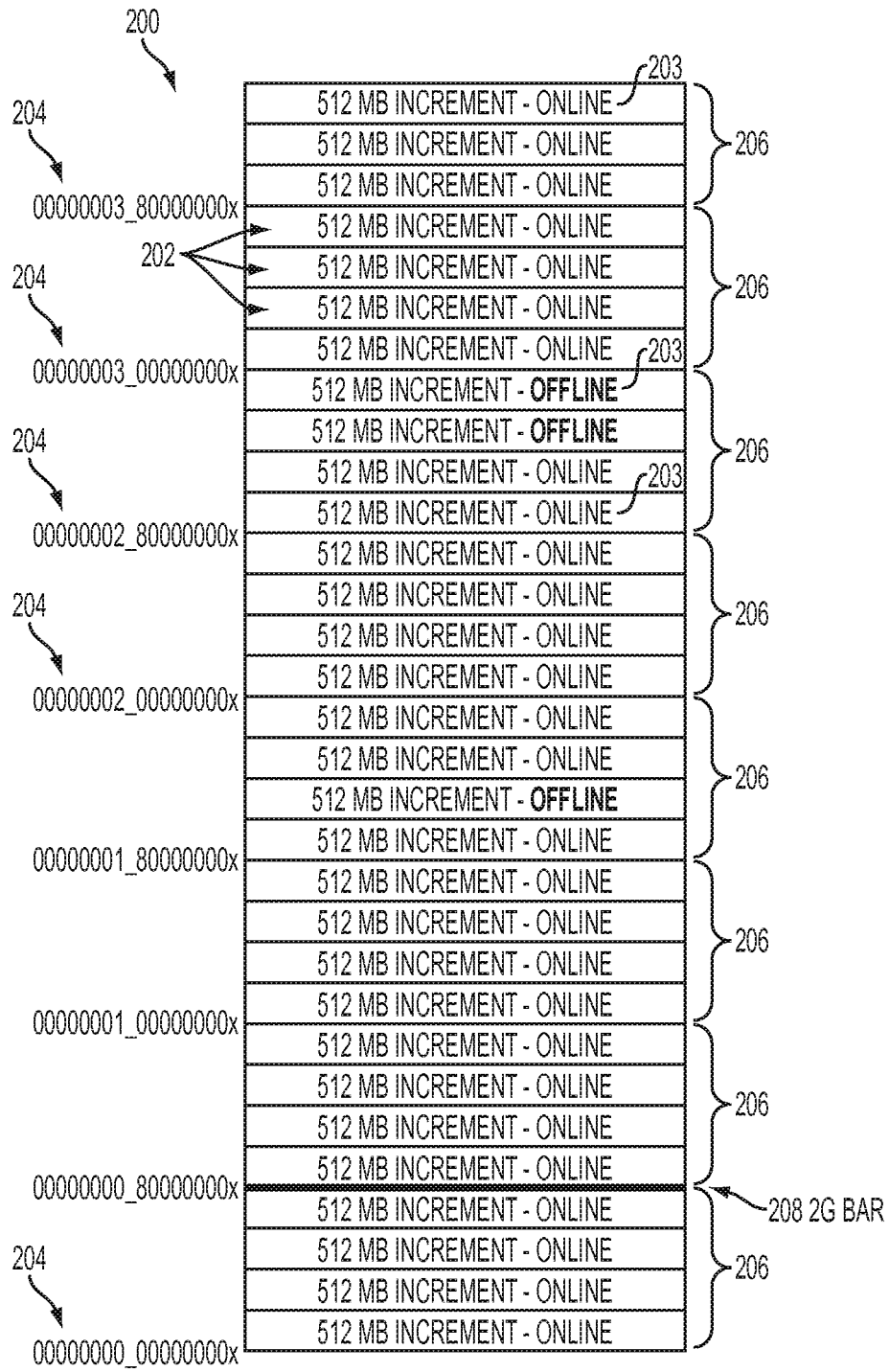
FIGS. 2A, 2B and 2C are block diagrams illustrating examples of real storage maps in accordance with exemplary embodiments.
Figure 2B:
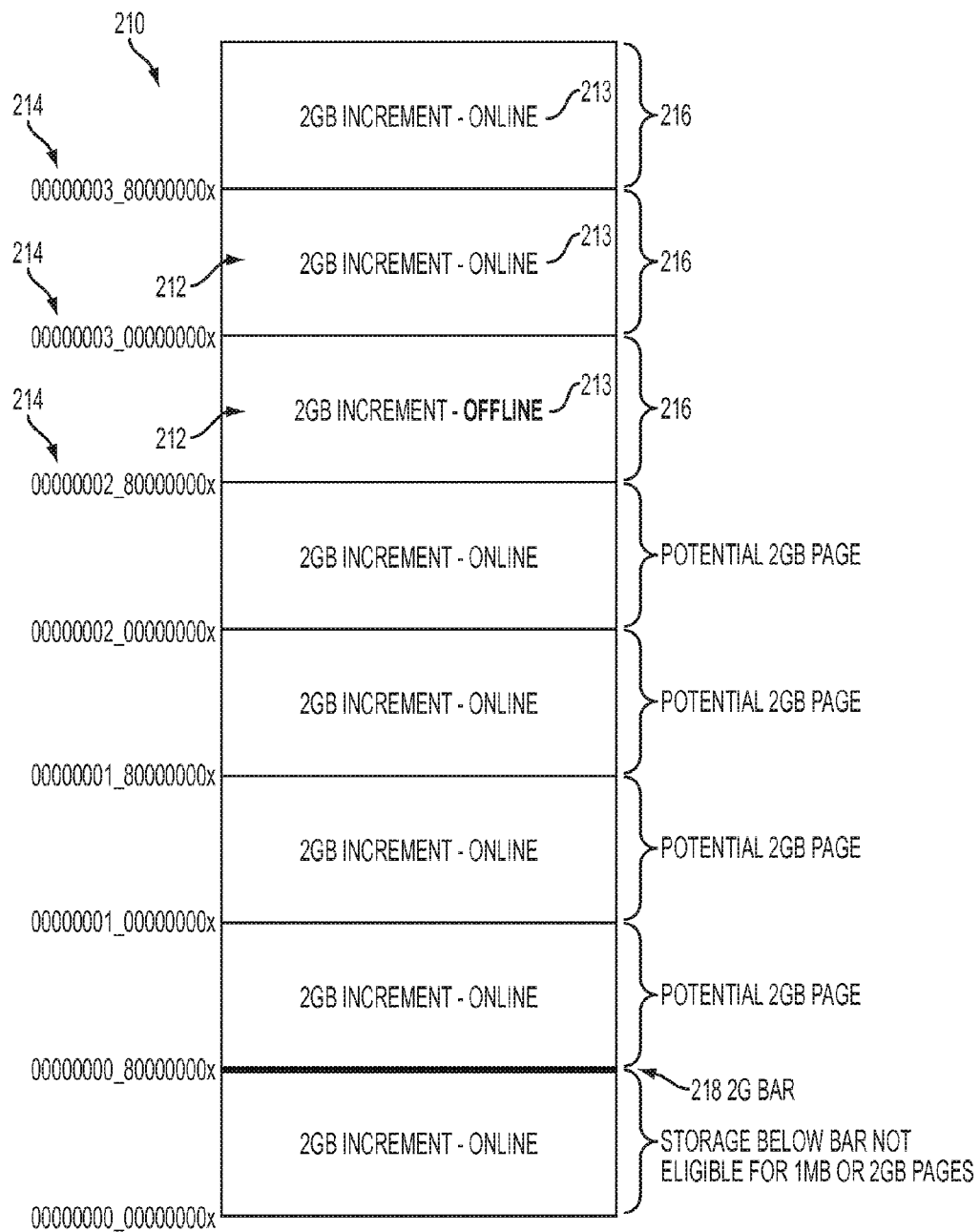
Figure 2C:
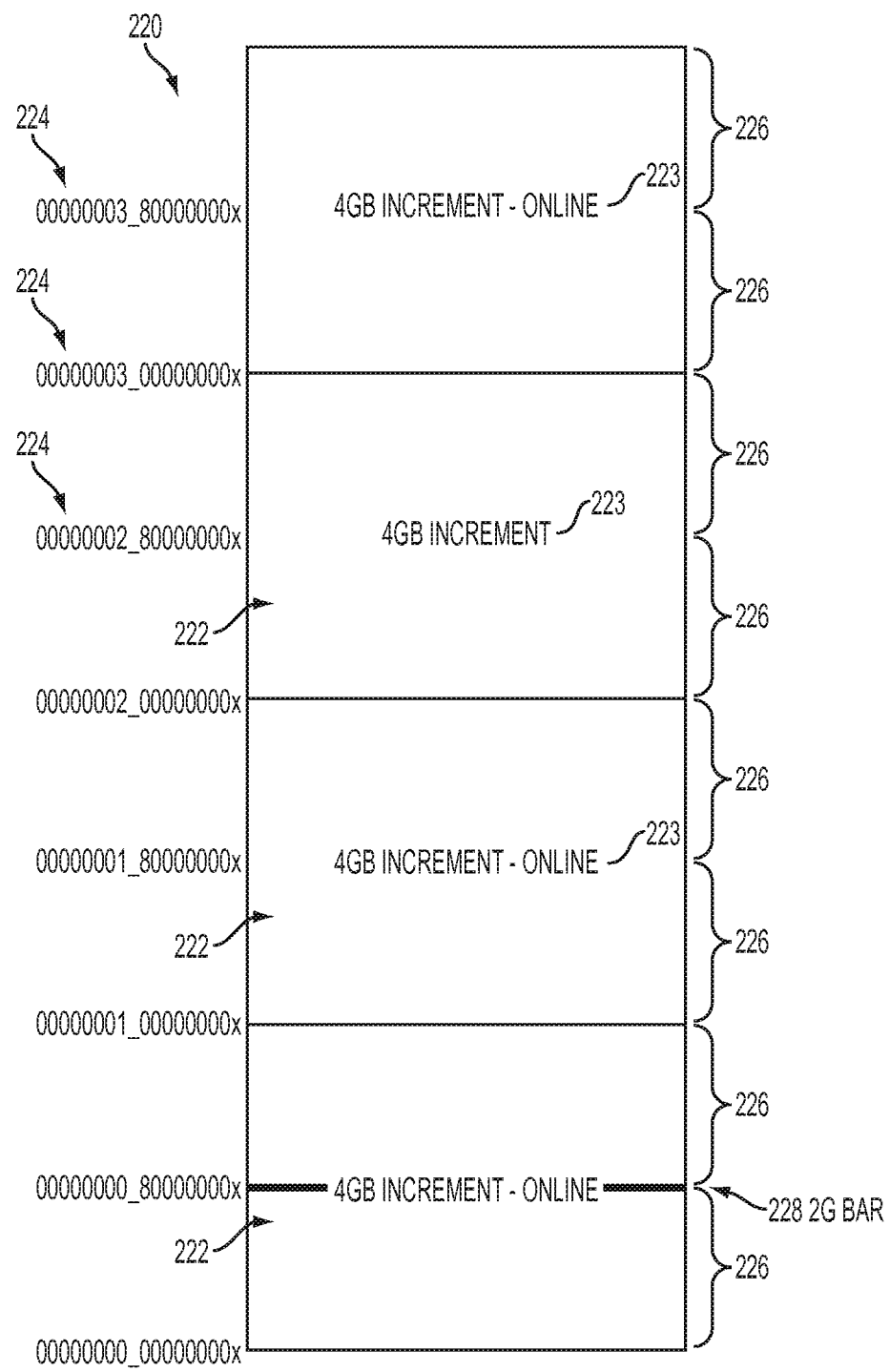

Referring now to FIGS. 2A-2C, block diagrams of real storage maps are shown. It will be appreciated by those of ordinary skill in the art that these storage maps are only for illustrative purposes as real systems will have more storage with the increment sizes shown.

FIG. 2A illustrates a storage map 200 having thirty-one storage increments 202 with each increment sized at 512 MB. Each of the storage increments 202 includes a status 203, which indicates if the storage increment 202 is online or offline. As illustrated, all but three of the storage increments 202 are online. The storage map includes seven sections 206 that start and end on a 2 GB boundary, with each section 206 including four storage increments 202. Each of the sections 206 includes an address 204, which indicates the starting address of the section 206. In exemplary embodiments, the first 2 GB section 206, which is the section 206 with the lowest address 204, can not be reserved for a 2 GB page or for 1 MB pages because no real storage below bar 208 is available to be used for 1 MB or 2 GB pages. Sections 206 above the bar 208 that include four online increments 202 can potentially be used for 2 GB pages. However, storage sections 206 above the bar 208 that include one or more offline increments 202 or less than four online increments 202 can not be used as a 2 GB page. However, the online increments 202 of sections 206 that can not be used for 2 GB pages may be used for 1 MB pages. In addition, any of the sections 206 that can be used 2 GB pages may also be used instead as 2048 1 MB pages.

FIG. 2B illustrates a storage map 210 having eight storage increments 212 with each increment having a size of 2 GB. Each of the storage increments 212 includes a status 213, which indicates if the storage increment 212 is online or offline. As illustrated, all but one of the storage increments 212 are online. As illustrated, the storage map includes eight sections 216 that start and end on a 2 GB boundary, with each section 216 including one storage increment 212. Each of the sections 216 includes an address 214, which indicates the starting address of the section 216. In exemplary embodiments, the first 2 GB section 216, which is the section 216 with the lowest address 214, can not be used as a 2 GB page or as 1 MB pages because no real storage below the bar 218 is available to be used for 1 MB or 2 GB pages. Each of the remaining online increments 212 are eligible to use as 2 GB pages, or as 2048 1 MB pages.

FIG. 2C illustrates a storage map 220 having four storage increments 222 with each increment sized at 4 GB. Each of the storage increments 222 includes a status 223, which indicates if the storage increment 222 is online or offline. As illustrated, all of the storage increments 222 are online. As illustrated, the storage map includes eight sections 226 that start and end on a 2 GB boundary. Each of the sections 226 includes an address 224, which indicates the starting address of the section 226. In exemplary embodiments, the first 2 GB section 226, which is the section 226 with the lowest address 224, can not be used as a 2 GB page or as 1 MB pages because no real storage below the bar 228 is available to be used for 1 MB or 2 GB pages. The remaining section 226 of the first increment 222 can be used as a 2 GB page (or as 2048 1 MB pages). In addition, each of the remaining increments 222 can be used as two 2 GB pages, one 2 GB page and 2048 1 MB pages, or 4096 1 MB pages.

Figure 3:
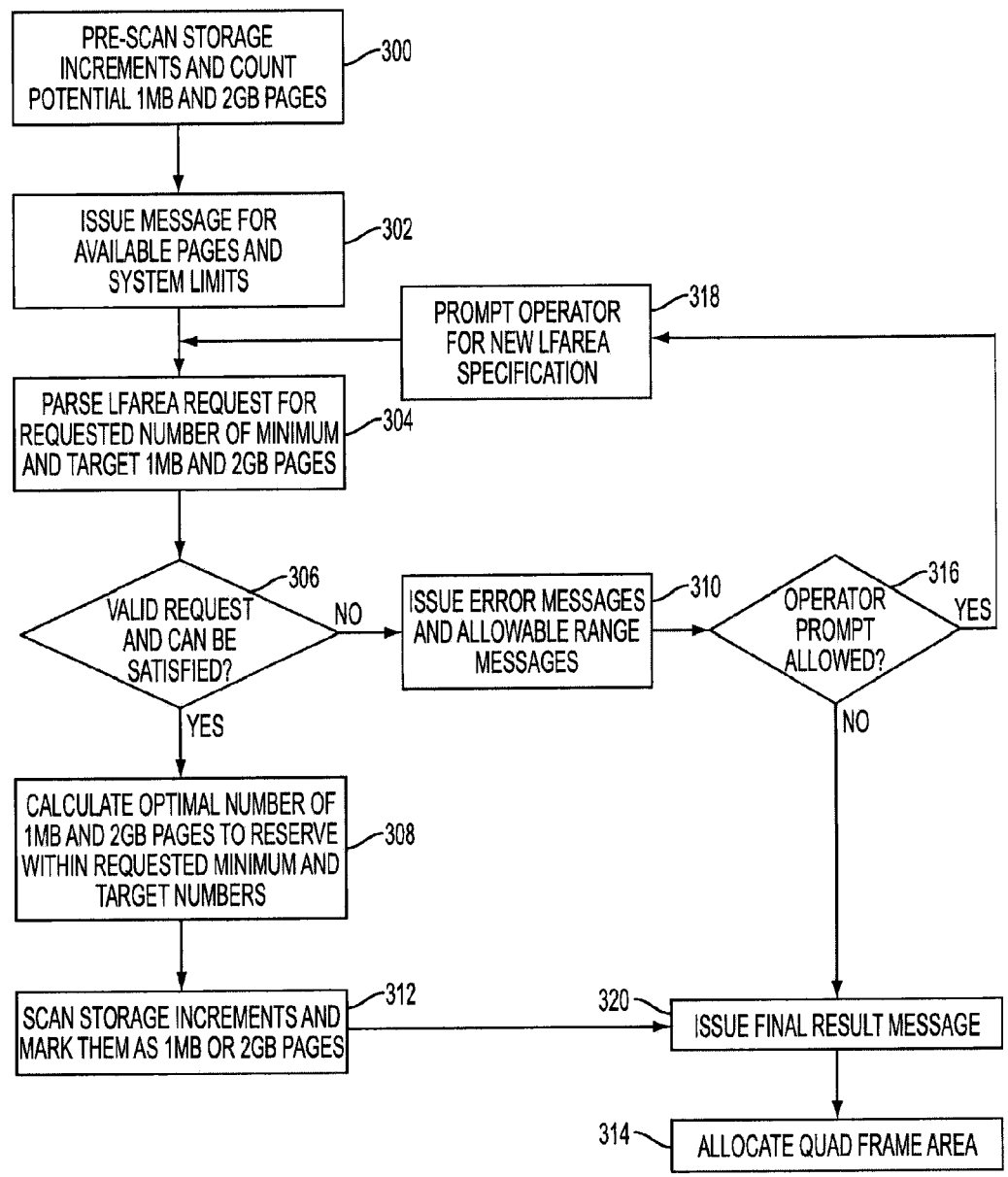
FIG. 3 is a block diagram illustrating a method for reserving 1 MB and 2 GB pages in the LFAREA in accordance with an exemplary embodiment.

Referring now to FIG. 3, a flowchart diagram illustrating a method for reserving 1 MB and 2 GB pages in the LFAREA in accordance with an exemplary embodiment is shown. As shown at block 300, the method includes a pre-scan stage that counts the number of available 1 MB pages and 2 GB pages that are found among the online storage increments. An exemplary embodiment of the pre-scan stage is described in more detail with reference to FIG. 4. Next, as shown at block 302 the method includes issuing a message that indicates how many pages are available for each type of request that are within the system limit. For example, the message may include a number of 1 MB pages and a number of 2 GB pages available for use in the LFAREA. As shown at block 304, the method includes parsing the LFAREA request and determining the target number of 1 MB and 2 GB pages requested to be reserved. Next, as shown at decision block 306, the method includes determining if the LFAREA request is valid and if the request can be satisfied. If the LFAREA request is not valid or can not be satisfied, the method proceeds to block 310 and messages to explain the error and provide information on the number of available 1 MB and 2 GB pages are issued. As shown at decision block 316, if an operator prompt is allowed the method may proceed to block 318, otherwise the method proceeds to block 320 and issues a final result message. At block 318, an operator is prompted for a new LFAREA specification. If the LFAREA request is valid and can be satisfied, the method proceeds to block 308 and the optimal number of 1 MB and 2 GB pages to be reserved is calculated. Next, the method proceeds to block 312 and the storage increments are scanned and the 1 MB and 2 GB indicators are set to reserve the pages in the LFAREA. An exemplary embodiment of a method for scanning and reserving pages in the LFAREA is described in more detail with reference to FIGS. 5A, 5B and 5C. Next, as shown at block 320, the results message is issued along with specific diagnostic messages for any cases where the full target amounts were not achieved. As shown at block 314, after the LFAREA has been scanned and the requested pages have been reserved the method includes allocating a quad frame area. An exemplary embodiment of a method for reserving a quad frame area is described in more detail with reference to FIG. 6.

In exemplary embodiments, the LFAREA specification may include both a minimum and a target value for both 1 MB and 2 GB pages:

LFAREA=(1M=(x,y),2G=(w,z){,prompt|,noprompt})

where x and w are the target values for the requested number of pages, and y and z are minimum values or:

LFAREA=(1M=(x%,y%),2G=(w%,z%){,prompt|,noprompt})

where x % and w % are target storage percentages for requested pages, and y % and z % are minimum percentages. In exemplary embodiments, if 1M= is not specified, but 2G= is specified, then zero 1 MB pages will be reserved in the large frame area. Likewise, if 2G= is not specified, but 1M= is specified, then zero 2 GB pages will be reserved in the large frame area. In exemplary embodiments, the target will be satisfied if a sufficient amount of online storage exists for 1 MB and 2 GB pages. Once the amount of storage is reserved for 1 MB or 2 GB pages (whether the requested amount or a lesser amount when sufficient storage is not available at the requested amount but is sufficient at or above the minimum amount), the amount will not be changed at any later point other than possibly being reduced because of bad frames.

In exemplary embodiment, the minimum value may be optionally specified. The minimum value specifies the minimum number or amount of 1 MB or 2 GB pages that will be acceptable in satisfying the request if the target number or amount of pages can not be reserved. In addition, the minimum, if specified, must be a number if target is a number, or a percentage if target is a percentage, and must be less than or equal to target. If minimum and target are specified with the same value, then the request will be satisfied only at that value. If minimum is less than target, the request will be satisfied at some value between target and minimum, inclusive. In exemplary embodiments, the default for minimum is the same value specified for target.

In exemplary embodiments, one of prompt or noprompt may be optionally specified. Prompt indicates that the operator should be prompted for a new LFAREA=specification if the request can not be satisfied by at least the minimum (which defaults to target if not specified), or sum of minimums. Noprompt indicates that the operator is not to be prompted if the request can not be satisfied, and that instead, zero pages are to be reserved for both 1 MB and 2 GB pages. In exemplary embodiments, the sum of the storage requested to be reserved for both 1 MB and 2 GB pages can not exceed a maximum of 80 percent of online real storage minus 4 GB. For example, in a system with 10 GB of online real storage, the maximum amount of storage that can be reserved for both 1 MB and 2 GB pages can not exceed 4.8 GB (0.8*(10 GB-4 GB)). There may be cases where fragmentation prevents a request for even less than 80 percent to be satisfied. These cases will be handled as described above where the requested number or amount of pages will be satisfied between the target and minimum if a minimum is specified, and with or without a prompt depending on whether prompt or noprompt is specified.

Figure 4:
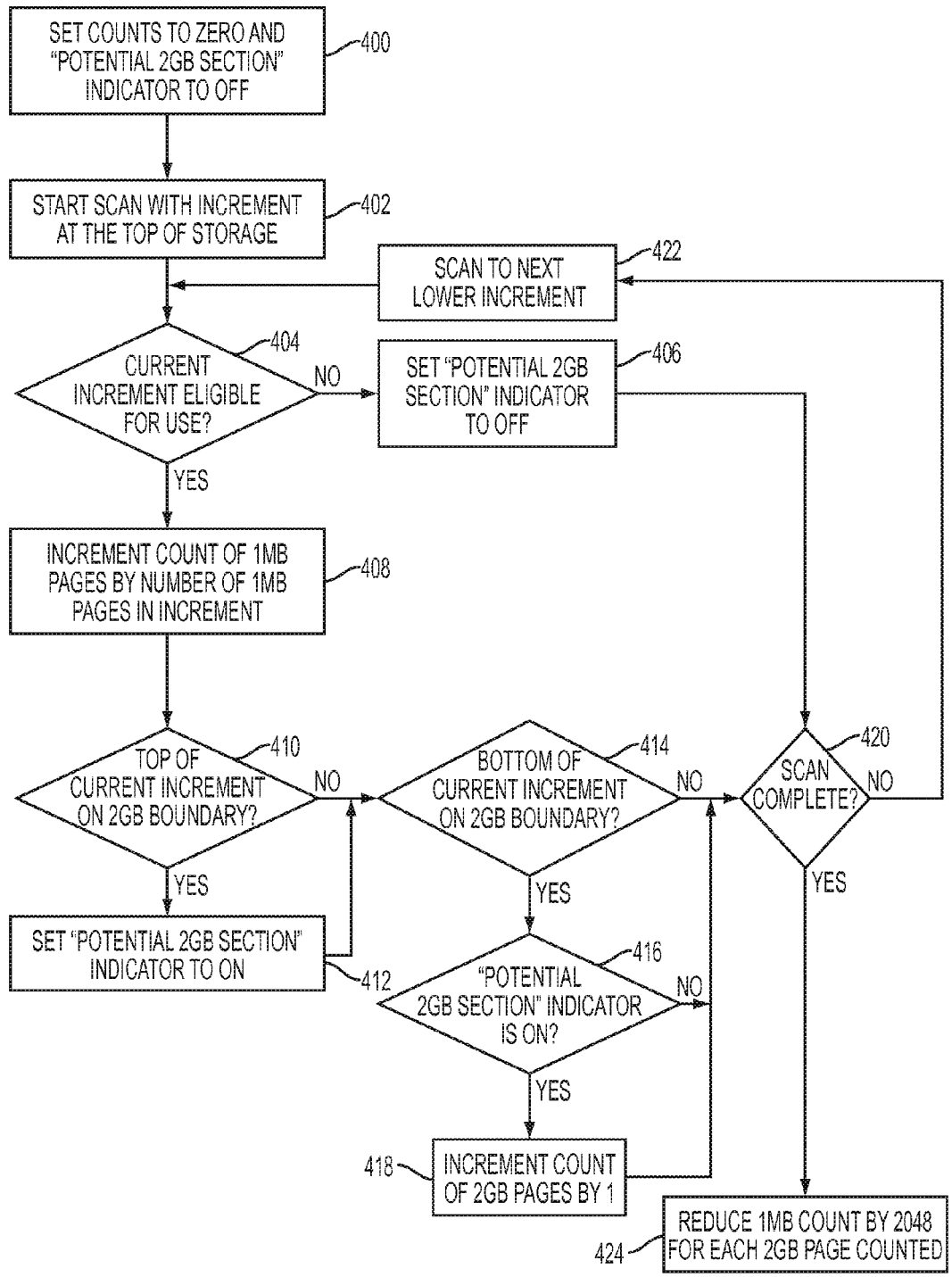
FIG. 4 is a flowchart diagram illustrating a method for scanning the LFAREA to count the number of 1 MB pages and 2 GB pages that are found among the online storage increments in accordance with an exemplary embodiment.

Referring now to FIG. 4, a flowchart diagram illustrating a method for scanning the LFAREA to count the number of 1 MB pages and 2 GB pages that are found among the online storage increments in accordance with an exemplary embodiment is shown. As shown at block 400, the method includes setting one or more counters to zero and potential 2 GB section indicators to OFF. Next, at block 402, the method includes starting a scanning process with the increment at the top of the real storage, which is the increment with the highest address value. As shown at decision block 404, the method includes determining if the current increment is eligible for use. If the current increment is not eligible for use, the method proceeds to block 406 and the potential 2 GB section indicator is set to OFF. If the current increment is eligible for use the method proceeds to block 408 and a counter of 1 MB pages is increased by the number of potential 1 MB pages in the increment. Next, as shown at decision block 410 the method includes determining if the top of the current increment is on a 2 GB boundary. If the top of the current increment is on a 2 GB boundary, the method proceeds to block 412 where the potential 2 GB indicator is set, and then from block 412 to decision block 414. If the determination made at decision block 410 is that the current increment is not on a 2 GB boundary, the method proceeds directly to decision block 414. At decision block 414, if the bottom of the current increment is on a 2 GB boundary, the method proceeds to decision block 420. If the bottom of the current increment is not on a 2 GB boundary, the method proceeds to decision block 420. If the bottom of the current increment is on a 2 GB boundary, the method proceeds to decision block 416 and it is determined if the potential 2 GB section indicator is set to ON. If the potential 2 GB section indicator is set to ON, then as shown at block 418 a counter of 2 GB pages in incremented by one. At decision block 420, the method includes determining if the scan is complete. If the scan not is complete, the method proceeds to block 422 and the next increment is scanned. If the scan is complete, the method proceeds to block 424 and the 1 MB counter is reduced by 2048 for each of the 2 GB pages counted.

Figure 5A:
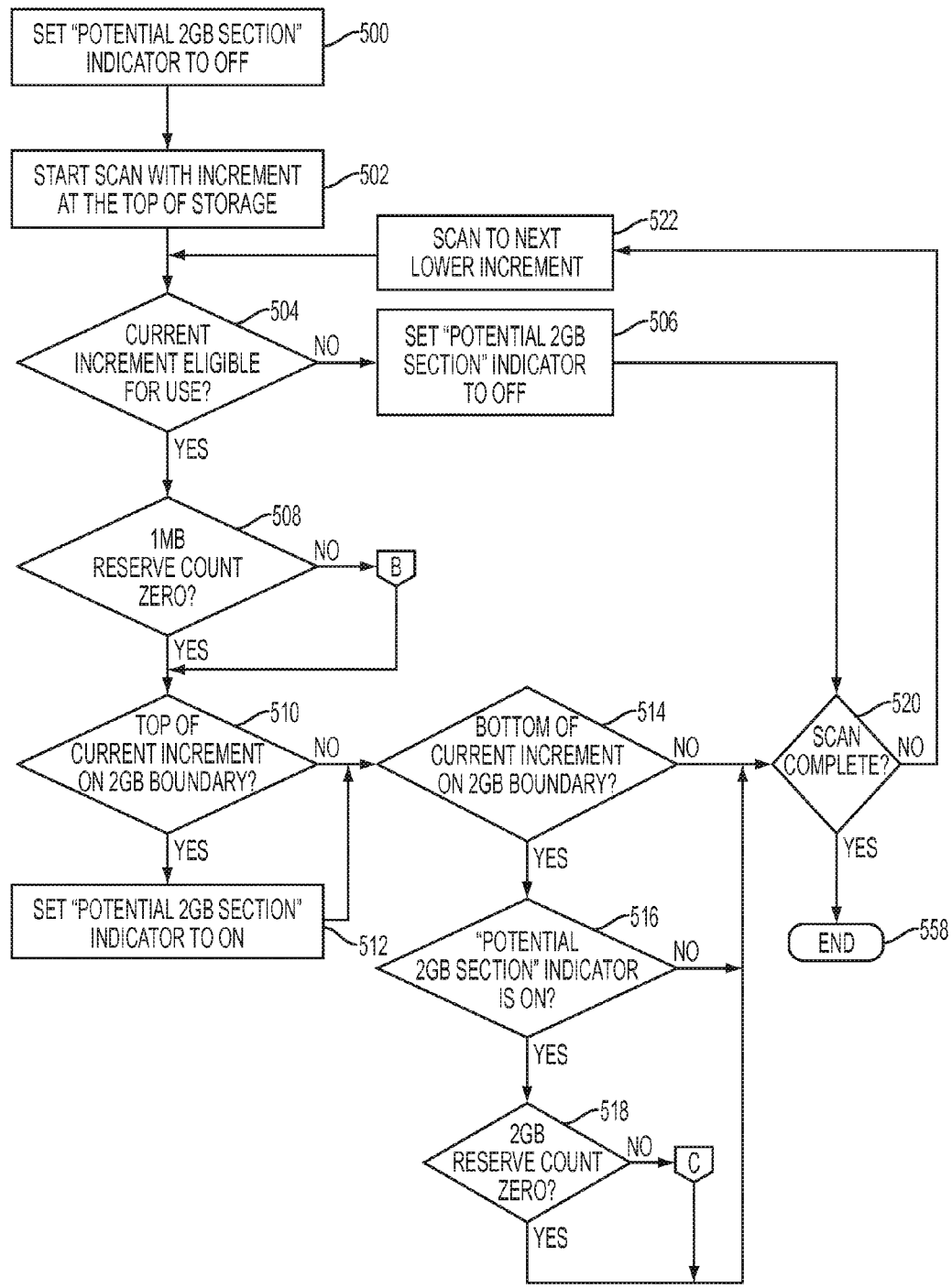
FIGS. 5A, 5B and 5C are flowchart diagrams illustrating a method for scanning the LFAREA to reserve the 1 MB pages and 2 GB pages in accordance with an exemplary embodiment.
Figure 5B:
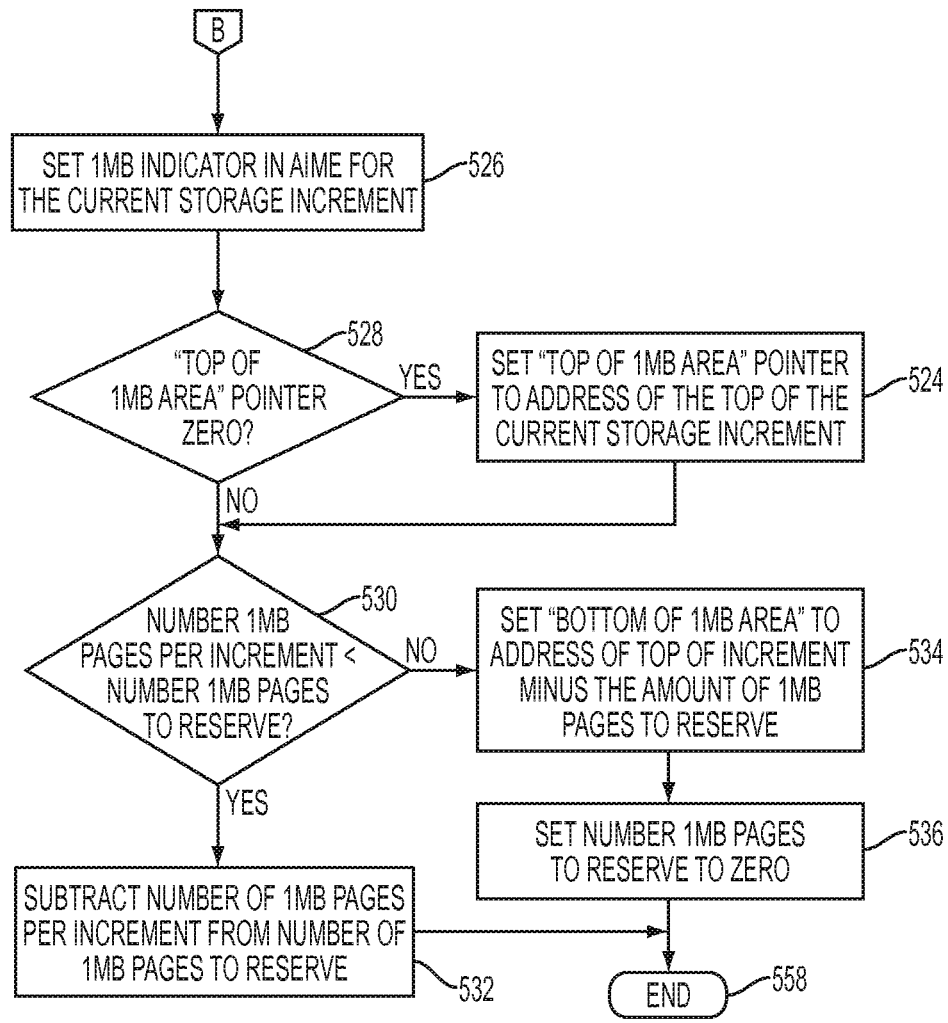
Figure 5C:
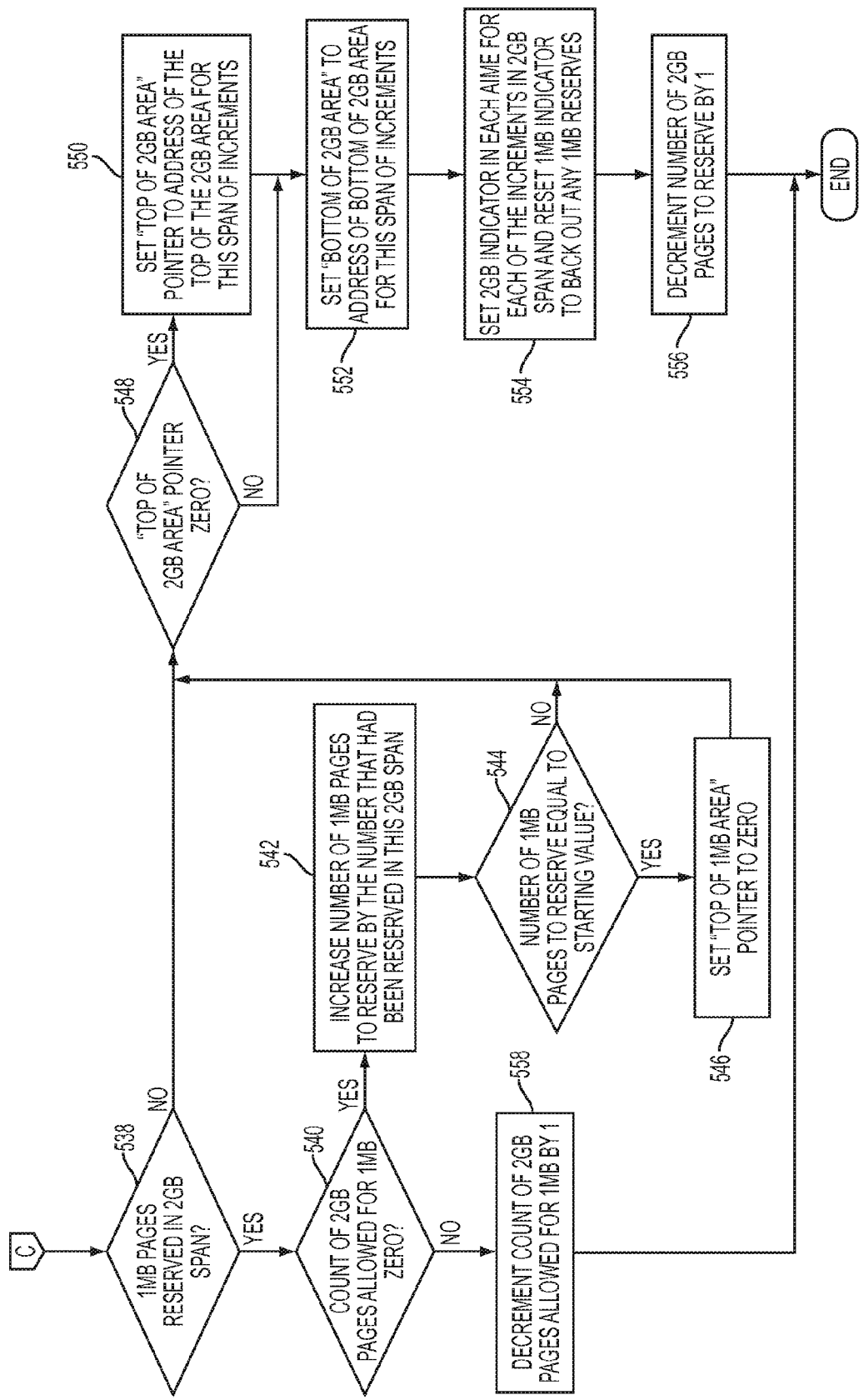

Referring now to FIGS. 5A, 5B and 5C, flowchart diagrams illustrating a method for scanning the LFAREA to reserve the 1 MB pages and 2 GB pages in accordance with an exemplary embodiment are shown. As shown at block 500, the method includes setting one or more counters to zero and potential 2 GB section indicators to OFF. Next, at block 502, the method includes starting a scanning process with the increment at the top of the real storage, which is the increment with the highest address value. As shown at decision block 504, the method includes determining if the current increment is eligible for use. If the current increment is not eligible for use, the method proceeds to block 506 and the potential 2 GB section indicator is set to OFF. If the current increment is eligible for use the method proceeds to decision block 508 and it is determined if the 1 MB reserve counter has a value of zero. If the 1 MB reserve counter has a non-zero value, the method proceeds to block 526. If the 1 MB reserve counter has a zero value, the method proceeds to decision block 510 and it is determined if the top of the current increment is on a 2 GB boundary. If the top of the current increment is on a 2 GB boundary, the method proceeds to block 512 and the potential 2 GB section indicator is set to ON. If the top of the current increment is not on a 2 GB boundary, the method proceeds to decision block 514 and it is determined if the bottom of the current increment is on a 2 GB boundary. If the bottom of the current increment is not on a 2 GB boundary, the method proceeds to decision block 520. If the bottom of the current increment is on a 2 GB boundary, the method proceeds to decision block 516 and it is determined if the potential 2 GB section indicator is set to ON. If the potential 2 GB section indicator is not set to ON, the method proceeds to decision block 520. If the potential 2 GB section indicator is set to ON, the method proceeds to decision block 518 and it is determined if the 2 GB reserve counter has a zero value. If the 2 GB reserve counter has a zero value, the method proceeds to decision block 520. If the 2 GB reserve counter has a non-zero value, the method proceeds to decision block 538. At decision block 520, the method includes determining if the scan is complete. If the scan not is complete, the method proceeds to block 522 and the next increment is scanned. If the scan is complete, the method ends as shown at block 558.

Continuing with reference to FIG. 5B, as shown at block 526 the method includes setting a 1 MB indicator in address increment map entries (AIME) for the current storage increment. Next, as shown at decision block 528, it is determined if the top of the 1 MB area pointer has a zero value. If the top of the 1 MB area pointer has a zero value, the method proceeds to block 524 and the top of the 1 MB area pointer is set to the address of the top of the current storage increment. If the top of the 1 MB area pointer has a non-zero value, the method proceeds to decision block 530 and it is determined if the number of 1 MB pages per increment is less that the number of 1 MB pages to be reserved. If the number of 1 MB pages per increment is less that the number of 1 MB pages to be reserved, the method proceeds to block 532 and the number of 1 MB pages per increment is subtracted from the number of 1 MB pages to be reserved. Otherwise, the method proceeds to block 534 and sets the bottom of the 1 MB area to the address of the top of increment minus the amount of 1 MB pages to be reserved. Next, as shown at block 536, the method includes setting the number of 1 MB pages to be reserved to zero.

Continuing with reference to FIG. 5C, as shown at decision block 538 the method includes determining if 1 MB pages are reserved in a 2 GB span. If 1 MB pages are reserved in a 2 GB span, the method proceeds to decision block 540 and it is determined if the counter of 2 GB pages allows for 1 MB has a zero value. If 1 MB pages are not reserved in a 2 GB span, the method proceeds to decision block 548. If the counter of 2 GB pages allowed for 1 MB has a zero value, the method proceeds to block 542 and increases the number of 1 MB pages to be reserved by the number that had been reserved in this 2 GB span. Next, as shown at decision block 544 the method includes determining if the number of 1 MB pages to be reserved is equal to the starting value. If the number of 1 MB pages to be reserved is equal to the starting value, the method proceeds to block 546 and sets the top of the 1 MB area pointer to zero. Otherwise, the method proceeds to decision block 548. If the counter of 2 GB pages allowed for 1 MB has a non-zero value, the method proceeds to block 558 and decrements the count of 2 GB pages allowed for 1 MB by one. At decision block 548 it is determined if the top of the 2 GB area pointer has a zero value. If the top of the 2 GB area pointer has a zero value, the method proceeds to block 550 and sets the top of the 2 GB area pointer to the address of the top of the 2 GB area for this span of increments. Otherwise, the method proceeds to block 522 and sets the bottom of the 2 GB area to the address of the bottom of the 2 GB area for this span of increments. Next, as shown at block 544, the method includes setting the 2 GB indicator in each AIME for each of the increments in the 2 GB span and resetting the 1 MB indicator to back out any 1 MB reserves. As shown at block 556, the number of 2 GB pages to be reserved is decremented by one.

In exemplary embodiment, the quad area is reserved from one or more real storage increments that are online. The size of the quad area is calculated to be 12.5 percent of online real storage. The quad area is placed in increments above the 16 MB line starting from the top of storage. In exemplary embodiments, the processing to reserve 1 MB and 2 GB areas is done prior to the process of reserving the quad area. In exemplary embodiments, the location of where the quad area will reside depends on whether a 1 MB area was reserved and where it resides, whether a 2 GB area was reserved and where it resides, and the increment size used in the system.

In exemplary embodiments, because the LFAREA is limited to 80 percent of (online storage—4 GB), there will always be enough storage to satisfy the quad area. In exemplary embodiments, each area (1 MB, 2 GB, and quad) may reside in one or more increments (meaning they can span increments). In some cases, one area can end within an increment and another area can begin in the same increment, meaning the increment can be shared for the two areas. In yet other cases, one increment containing one area can be followed by another increment of a different area, and then that increment followed by a third increment that is a resumption of the first area. In no cases, however, will one area in an increment be followed by another area in the same increment and then followed again by the first area in the same increment.

In exemplary embodiments, an address increment map entries (AIME) represent the increments and contain flags to indicate which areas are contained in the increment. Each area has a top and bottom pointer. The process of locating an area involves scanning the AIMEs looking for an AIME that indicates the area of interest contained in the increment, and then using the top and bottom pointers to determine whether the area of interest occupies the entire increment or some portion of the increment. In exemplary embodiments, the quad area and the 1 MB area must not be interleaved if they share an increment, meaning that in any one increment no portion of the quad area may appear between the top and bottom of the 1 MB area, and no 1 MB portions may appear between the top and bottom of the quad area. This requirement is needed to simplify the task of identifying the start and end of each area using only the AIME indicators and the area top and bottom pointers. This requirement is satisfied by the fact that the processing to reserve the 1 MB area (and the 2 GB area) is done first. As a result, the only case where both 1 MB and quad could share an increment is where the bottom of the 1 MB area falls somewhere above the bottom of the increment leaving space in the bottom of the increment where the top of the quad area can be started. In this case, no interleaving is created. Similarly, the quad area and the 2 GB area must not be interleaved if they share an increment, meaning that in any one increment no portion of the quad area may appear between the top and bottom of the 2 GB area, and no 2 GB portions may appear between the top or bottom on the quad area.

Figure 6:
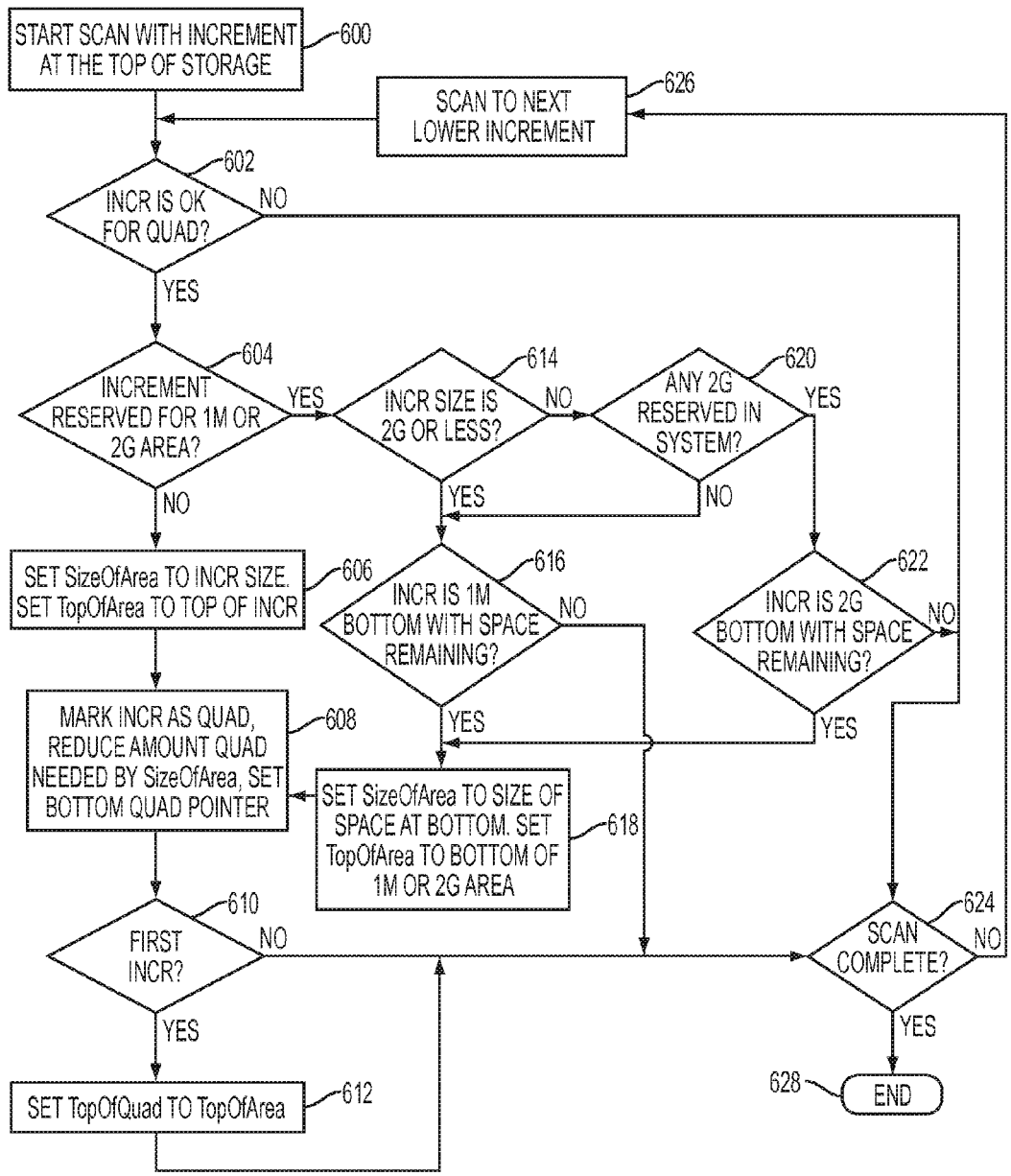
FIG. 6 is a flowchart diagram illustrating a method for reserving a quad frame area in accordance with an exemplary embodiment.

Referring now to FIG. 6, a flowchart diagram illustrating a method for reserving a quad frame area in accordance with an exemplary embodiment is shown. As shown at block 600, the method starts scanning with the increment at the top of the storage, which is the increment with the highest address. Next, as shown at decision block 602, the method includes determining if the increment can be used for the quad area. If the increment can not be used for the quad area, the method proceeds to block 624. Otherwise the method proceeds to decision block 604 and it is determined if the increment is reserved for a 1 MB or 2 GB area. If the increment is not reserved for a 1 MB or 2 GB area, then the method includes setting a size of area for the full size of the increment and to set top of area to the top of the increment, as shown at block 606. Next, the method continues at block 608 and marks the increment as part of the quad, reduces the amount of storage needed for the quad area by the size of area, and sets the bottom pointer for the quad area to either the bottom of the increment, or above the bottom of the increment if the amount of storage needed to satisfy the quad area is less than size of area. As shown at decision block 610 the method includes determining if the increment is the first increment that has been reserved for the quad area. If the increment is the first increment that has been reserved for the quad area, the method proceeds to block 612 and the top of quad area is set to the top of the area. Otherwise, the method proceeds to decision block 624.

Continuing with reference to FIG. 6, if the increment is reserved for a 1 MB or 2 GB area, then the method proceeds to decision block 614 and it is determined if the size of the increment is 2 GB or less. If the size of the increment is 2 GB or less, the method proceeds to decision block 616 and it is determined if the 1 MB area has ended before the bottom of the increment, thus leaving space at the bottom of the increment where the quad area can start or resume. If so, the method proceeds to block 618 and the size of area is set to the remaining amount of storage at the bottom of the increment, the top of area is set to the start of the remaining storage, and method proceeds to block 608. If the size of the increment is greater than 2 GB, the method proceeds to decision block 620 and it is determined if any 2 GB areas are reserved in the system. If there are no 2 GB areas are reserved in the system the method proceeds to block 616. Otherwise, the method proceeds to block 622 and it is determined if the 2 GB area has ended before the bottom of the increment, thus leaving space at the bottom of the increment where the quad area can start or resume. If so, the method proceeds to block 618 and the size of area is set to the remaining amount of storage at the bottom of the increment, the top of area is set to the start of the remaining storage, and method proceeds to block 608. At decision block 624, the method includes determining if the scan is complete. If the scan is not complete, the method proceeds to block 626 and the next increment is scanned. Otherwise, the method concludes at block 628.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method for reserving a first size page and a second size page in a large frame area (LFAREA) of a main memory, the main memory including a plurality of storage increments, the method comprising:
   pre-scanning, by a processor, the plurality of storage increments and counting a number of available first size pages and second size pages in the plurality of storage increments that are online;
   issuing a message that indicates the number of available first size pages and second size pages;
   receiving and parsing an LFAREA request, wherein the LFAREA request includes a target number of first size pages and second size pages;
   calculating an optimal number of first size and second size pages to be reserved, based upon the target number of first size pages and second size pages, the number of available first size pages and second size pages and a system limit;
   determining if the LFAREA request is valid and if the LFAREA request can be satisfied; and
   based upon determining that the LFAREA request is valid and that the LFAREA request can be satisfied, scanning the plurality of the storage increments and reserving the optimal number of first size and second size pages in the LFAREA.

2. The method of claim 1, wherein the first size pages are 1 megabyte pages and the second size pages are 2 gigabyte pages.

3. The method of claim 1, further comprising:
   based upon determining that the LFAREA request is not valid or that the LFAREA request can not be satisfied, issuing an error message.

4. The method of claim 3, further comprising:
   based upon determining that an operator prompt is allowed, prompting an operator for a new LFAREA specification.

5. The method of claim 1, wherein the LFAREA request further includes a minimum number of first size pages and second size pages; and further comprising:
   calculating the optimal number of first size and second size pages to be reserved, based upon the target number of first size pages and second size pages, the number of available first size pages and second size pages, the minimum number of first size pages and second size pages and the system limit.

6. The method of claim 1, further comprising allocating a quad frame area of the real memory.

7. The method of claim 6, wherein the quad frame area is reserved from one or more storage increments that are online and a size of the quad area is 12.5 percent of storage increments that are online.

8. The method of claim 1, wherein the system limits require that a sum of the number of first size and second size pages to be reserved can not exceed a predetermined percentage of a value, the value equal to storage increments that are online minus a predetermined amount.

9. The method of claim 8, wherein the predetermined percentage is 80 percent and the predetermined amount is 4 GB.

10. A computer program product for reserving first size pages and second size pages in a large frame area (LFAREA) of a main memory, the main memory including a plurality of storage increments, the computer program product comprising:
a non-transitory tangible storage medium readable by a processing circuit and storing instructions for execution by the processing circuit for performing a method comprising: pre-scanning the plurality of storage increments and counting a number of available first size pages and second size pages in the plurality of storage increments that are online;
issuing a message that indicates the number of available first size pages and second size pages;
receiving and parsing an LFAREA request, wherein the LFAREA request includes a requested number of first size pages and second size pages;
calculating an optimal number of first size and second size pages to be reserved, based upon the target number of first size pages and second size pages, the number of available first size pages and second size pages and a system limit;
determining if the LFAREA request is valid and if the LFAREA request can be satisfied; and
based upon determining that the LFAREA request is valid and that the LFAREA request can be satisfied, scanning the plurality of the storage increments and reserving the optimal number of first size and second size pages in the LFAREA.

11. The computer program product of claim 10, wherein the first size pages are 1 megabyte pages and the second size pages are 2 gigabyte pages.

12. The computer program product of claim 10, the method further comprising:
based upon determining that the LFAREA request is not valid or that the LFAREA request can not be satisfied, issuing an error message.

13. The computer program product of claim 10, the method further comprising:
based upon determining that an operator prompt is allowed, prompting an operator for a new LFAREA specification.

14. The computer program product of claim 10, wherein the LFAREA request further includes a minimum number of first size pages and second size pages; and wherein the method further comprises:
calculating the optimal number of first size and second size pages to be reserved, based upon the target number of first size pages and second size pages, the number of available first size pages and second size pages, the minimum number of first size pages and second size pages and the system limit.

15. The computer program product of claim 10, the method further comprising allocating a quad frame area of the real memory.

16. The computer program product of claim 15, wherein the quad frame area is reserved from one or more storage increments that are online and a size of the quad area is 12.5 percent of storage increments that are online.

17. The computer program product of claim 10, wherein the system limit requires that a sum of the number of first size and second size pages to be reserved can not exceed a predetermined percentage of a value, the value equal to storage increments that are online minus a predetermined amount.

18. The computer program product of claim 17, wherein the predetermined percentage is 80 percent and the predetermined amount is 4 GB.

19. A computer system for reserving first size pages and second size pages in a large frame area (LFAREA) of a main memory, the system comprising:
a real storage manager configured to control a main memory, wherein the main memory includes a plurality of storage increments, the system configured to perform a method comprising:
pre-scanning the plurality of storage increments and counting a number of available first size pages and second size pages in the plurality of storage increments that are online;
issuing a message that indicates the number of available first size pages and second size pages;
receiving and parsing an LFAREA request, wherein the LFAREA request includes a target number of first size pages and second size pages;
calculating an optimal number of first size and second size pages to be reserved, based upon the target number of first size pages and second size pages, the number of available first size pages and second size pages and a system limit;
determining if the LFAREA request is valid and if the LFAREA request can be satisfied; and
based upon determining that the LFAREA request is valid and that the LFAREA request can be satisfied, scanning the plurality of the storage increments and reserving the optimal number of first size and second size pages in the LFAREA.

20. The computer system of claim 19, wherein the first size pages are 1 megabyte pages and the second size pages are 2 gigabyte pages.

21. The computer system of claim 19, the method further comprising:
based upon determining that the LFAREA request is not valid or that the LFAREA request can not be satisfied, issuing an error message.

22. The computer system, of claim 21, the method further comprising:
based upon determining that an operator prompt is allowed, prompting an operator for a new LFAREA specification.

23. The computer system of claim 19, the method further comprising allocating a quad frame area of the real memory.

24. The computer system of claim 23, wherein the quad frame area is reserved from one or more storage increments that are online and a size of the quad area is 12.5 percent of storage increments that are online.

25. The computer system of claim 19, wherein the LFAREA request further includes a minimum number of first size pages and second size pages; and wherein the method further comprises:
calculating the optimal number of first size and second size pages to be reserved, based upon the target number of first size pages and second size pages, the number of available first size pages and second size pages, the minimum number of first size pages and second size pages and the system limit.

26. The computer system of claim 19, wherein the system limit requires that a sum of the number of first size and second size pages to be reserved can not exceed a predetermined percentage of a value, the value equal to storage increments that are online minus a predetermined amount.

27. The computer system of claim 26, wherein the predetermined percentage is 80 percent and the predetermined amount is 4 GB.

* * * * *